(No Model.) 3 Sheets—Sheet 2.
H. C. GOODRICH.
VELOCIPEDE.
No. 425,779. Patented Apr. 15, 1890.
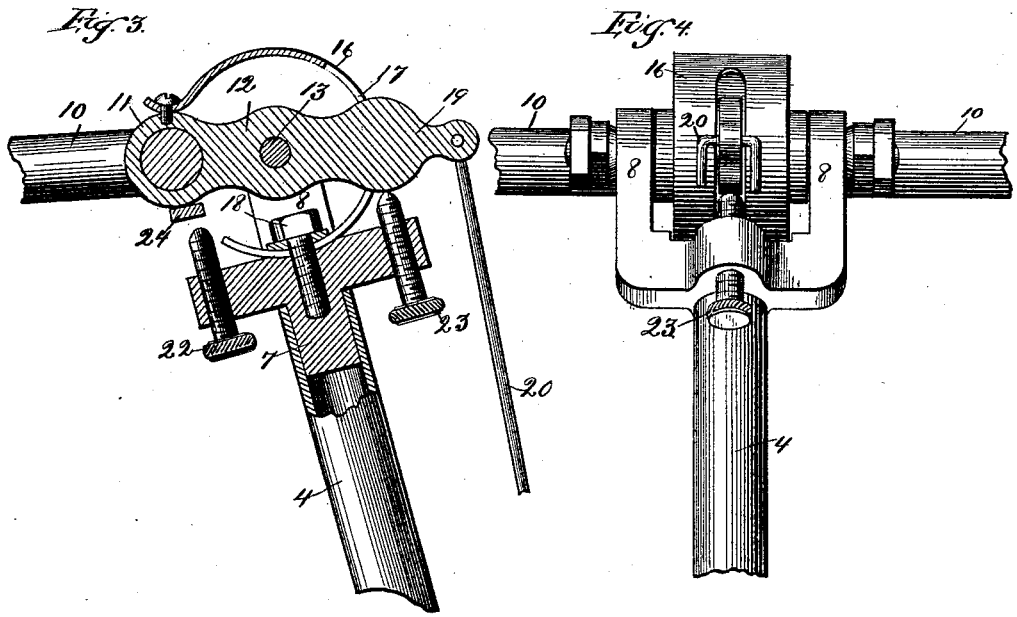
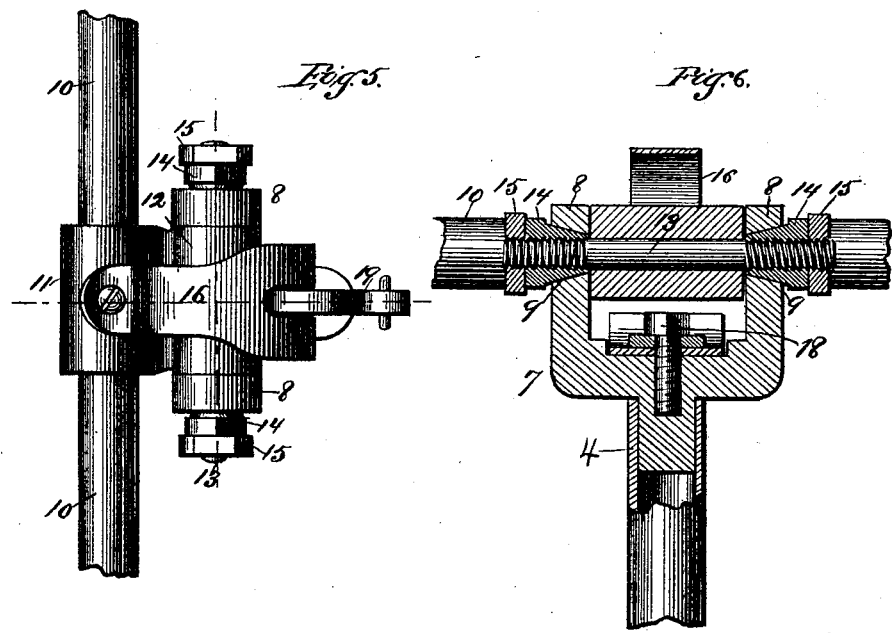
Witnesses.
Wm. M. Rheem.
J. R. Andrews.
Inventor.
Harry C. Goodrich
By Raymond & Leeder
Atty's.

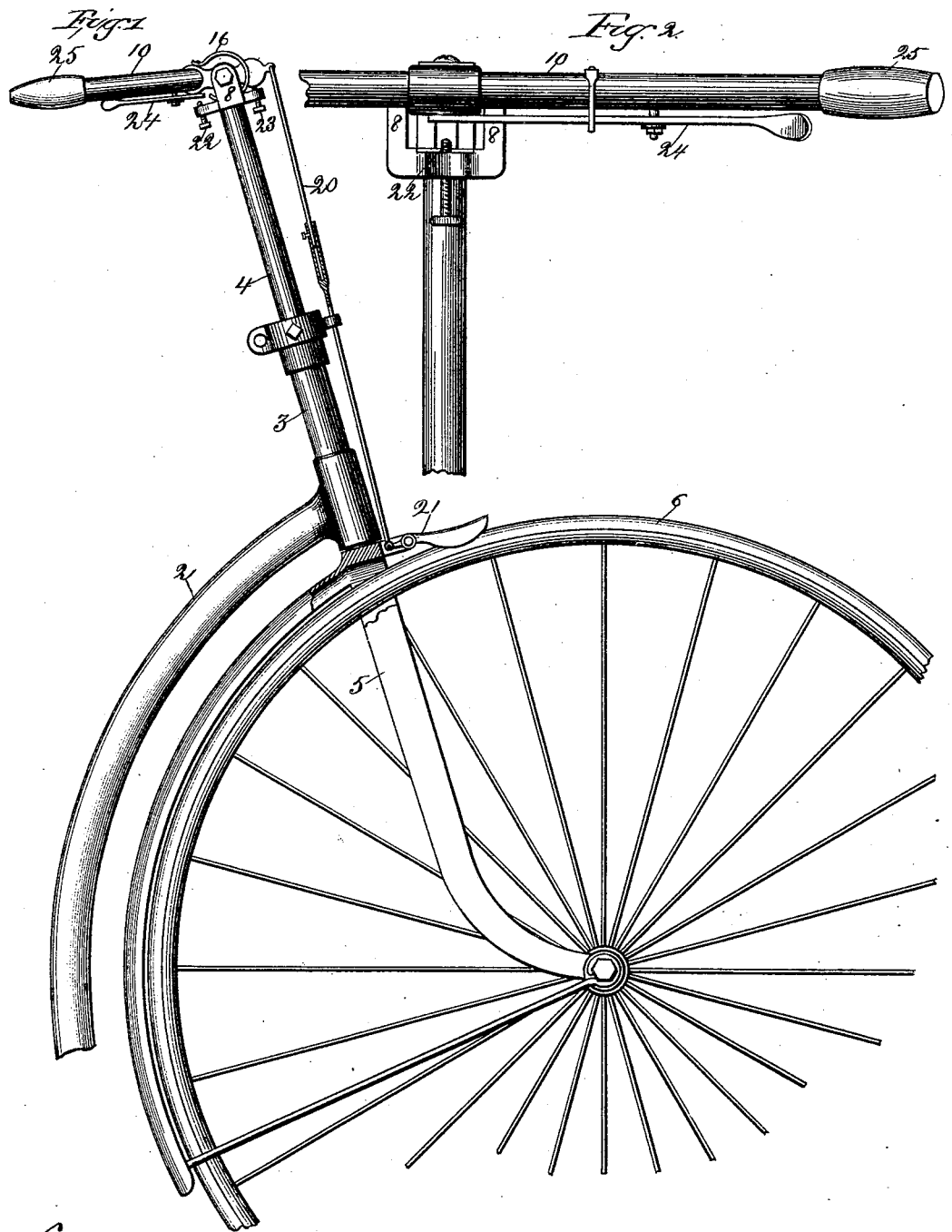

(No Model.) 3 Sheets—Sheet 3.
H. C. GOODRICH.
VELOCIPEDE.
No. 425,779. Patented Apr. 15, 1890.
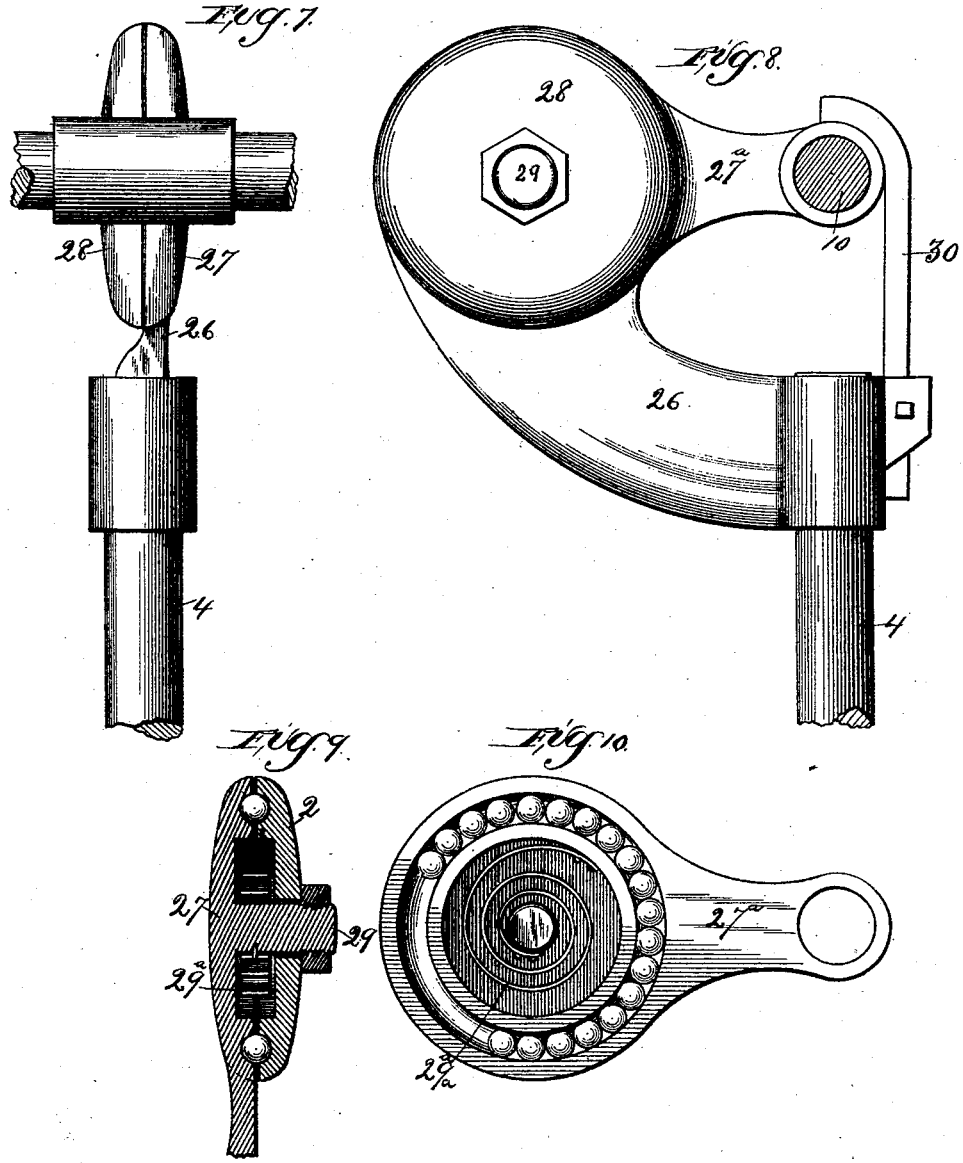
Witnesses,
P. H. P. Mason,
J. R. Andrews.
Inventor,
Harry C. Goodrich
By Raymond & Leeds
Attys
THE NORRIS PETERS CO., PHOTO-LITHO., WASHINGTON, D. C.

UNITED STATES PATENT OFFICE.

HARRY C. GOODRICH, OF CHICAGO, ILLINOIS.

VELOCIPEDE.

SPECIFICATION forming part of Letters Patent No. 425,779, dated April 15, 1890.

Application filed December 10, 1889. Serial No. 333,199. (No model.)

*To all whom it may concern:*

Be it known that I, HARRY C. GOODRICH, of Chicago, in the county of Cook and State of Illinois, have invented certain new and useful Improvements in Velocipedes, of which the following is a specification.

My invention relates to devices for connecting the handle-bar of a velocipede to the steering-wheel and to the devices for applying the brake through the medium of said handle-bar.

The primary object of my invention is to lessen the jar transmitted to the rider through the handle-bar by providing an elastic connection between the handle-bar and the steering-wheels. A second object connected with the first is to provide a simple and powerful brake mechanism.

In the accompanying drawings, Figure 1 is a side view of a portion of a steering-head of a velocipede having my improved handle-bar attachment and brake. Fig. 2 is a rear view of the upper portion of the steering-head and a part of the handle-bar. Fig. 3 is a cross-section, Fig. 4 a front view, Fig. 5 a plan view, and Fig. 6 a longitudinal section, of the same. Figs. 7 and 8 are rear and side views, respectively, of a modified form of connection. Fig. 9 is a cross-section of the same; and Fig. 10 shows one of the connecting links detached.

2, Fig. 1, is a portion of the backbone of the frame of the velocipede, to which is attached the steering-head 3, in which is swiveled the post 4, forming a part of the fork 5, in which is journaled the steering-wheel 6. The post 4 may be, and usually is in tricycles or in the safety-bicycles, adjustably connected to the fork 5, and is so shown in the accompanying drawings. The post 4 terminates in a casting or forging 7, (*vide* Figs. 3 to 6,) having jaws 8 8, through which are bored conical bearings 9, (*vide* Fig. 6,) the larger diameter of the cone being outward. The handle-bar 10 is fitted into a sleeve 11, having at one side a lug 12, which fits between the jaws 8. The lug 12 is bored for the reception of the pin 13, which is made long enough to project through the bearings 9 in the jaws 8. The outer ends of said pin are threaded and cone-nuts 14 14 are screwed thereon, the conical portion of the nuts fitting the bearings 9. Jam-nuts 15 15 are used to prevent the cone-nuts 14 from shifting. A spring 16, (*vide* Fig. 3,) having a slot 17 extending the greater portion of its length, is attached at one end to the handle-bar sleeve and at the other end is fastened to the piece 7 by a screw 18 passing through said slot. The tension of the spring may be adjusted by loosening the screw 18 and moving the spring longitudinally. The spring is preferably curved to conform to the arc of a circle whose center is the pin 13, to facilitate this adjustment. From the lug 12 an extension 19 projects forward through the slot 17 in the spring 16. From this projection 19 a rod 20 extends to the brake 21. (*Vide* Fig. 1.) The rod 20 is made adjustable as to its length to correspond with the adjustment of the post 4 in the ordinary manner. Screws 22 23 project upward from the piece 7 on each side of the pin 13. By adjusting said screws the amount of motion permitted on the pivot 13 is regulated. A thumb-lever 24 is pivoted on the handle-bar, its end extending to the middle of the handle-bar immediately above the adjusting-screw 22. (*Vide* Fig. 3.)

The operation will be obvious from the foregoing description. The handle-bar being bent backward in the usual manner, as shown in Fig. 1, forms, in connection with the sleeve 11 and its connected lug 12, a lever pivoted upon the pin 13. The irregularities of the road cause a movement in the rod 20 nearly in the direction of its length. The handle-bar projects backward from the post 4 nearly at right angles, so that the vibration of the post 4, instead of being communicated to the handles 25 of the handle-bar, simply produces a slight rotary movement of the handle-bar upon the pivot 13, so that by providing a spring of the proper flexibility the vibration of the post 4 is almost entirely absorbed. The rotary motion of the handle-bar upon the pin 13 in no way interferes with the steering of the velocipede, as the adjustment provided permits the taking up of all lost motion between the handle-bar and the post. The jaws 8 8 are confined between the lug 12 and the cone-nuts 14 14, so that they are not liable to become bent or distorted, each jaw being reenforced by the other. The brake is operated by pressing down upon the handle-bar, thus raising the projection 19 and the attached rod 20 and depressing the spoon of the brake 21, so as to bring it into contact with the wheel. To prevent an accidental pressure upon the handle-bar applying the brake, the thumb-lever 24 is employed. The end of the thumb-lever serves as a filling-block between the handle-bar and the adjusting-screw 22 and prevents the depression of the handle-bar to a sufficient extent to apply the brake; but the shifting of the end between the adjusting-screw 22 and the handle-bar allows of additional depression of the latter sufficient to apply the brake.

The modification shown in Figs. 7 to 10 shows a somewhat different connection of the handle-bar to the post 4. The casting 26, which terminates the steering-post 4, ends in a broad disk 27, the face of which has a semicircular groove. The piece 27, which is attached to the handle-bar 10, terminates in a similar disk 28, also having a semicircular groove, and the direct contact of the faces of said disks is prevented by the insertion of a number of balls in the aforesaid grooves. A stud or bolt 29, secured in one of said disks and passing through the other, serves to secure them together. A coiled spring 29$^a$, (seen in Figs. 9 and 10,) one end of which is attached to the stud or bolt 29 and the other to the disk which revolves thereon, forms the elastic connection between the post and the handle-bar. To limit the movement of the handle-bar, an adjustable guard 30 may be employed.

What I claim, and desire to secure by Letters Patent, is—

1. The combination, in a velocipede, of a handle-bar, a steering-post, a pivotal connection between the two, and a spring circularly curved about the axis of said pivotal connection and attached at its opposite ends to the handle-bar and the steering-post, one of said fastenings permitting adjustment of said spring in the direction of its length, substantially as described.

2. The combination, in a velocipede, of a handle-bar having a lug projecting therefrom, jaws formed on the steering-post, between which said lug is fitted, and a pivot-pin passing through said jaws and provided with coned nuts fitted to coned bearings in said jaws having their larger ends outward, whereby said jaws are confined between said coned nuts and said lug, substantially as described.

3. The combination, in a velocipede, of a vibratable handle-bar, a stop limiting the vibration of said handle-bar, a connection from the brake to said handle-bar, and a movable filling-piece between said handle-bar and said stop.

HARRY C. GOODRICH.

Witnesses:
P. H. T. MASON,
IRWIN VEEDER.